Aug. 27, 1957   H. B. TURNER   2,803,971

SPEED LIMITING ACCELERATOR PEDAL

Filed Nov. 26, 1954

INVENTOR.
HARLOWE B. TURNER
BY
McMorrow, Berman & Davidson
ATTORNEYS

United States Patent Office 2,803,971
Patented Aug. 27, 1957

2,803,971

SPEED LIMITING ACCELERATOR PEDAL

Harlowe B. Turner, Tampa, Fla.

Application November 26, 1954, Serial No. 471,183

4 Claims. (Cl. 74—526)

The present invention relates to accelerator pedals for automotive vehicles, and to one which has an adjustable speed limiting device incorporated in its structure.

The present invention has for its primary object to provide an accelerated pedal for an automotive vehicle having a safety speed limiting device incorporated in its structure, and one which has special construction permitting the vehicle to be operated at a speed greater than that limited by the safety device.

Another object of the present invention is to provide an accelerator pedal having an adjustable speed limiting device which may be selectively used or avoided to obtain an increase of speed of the vehicle beyond that limited by the safety device.

A further object of the present invention is to provide an accelerator pedal having two parts separated by an undulating line conformably shaped, in part, to the outer edge of a shoe sole, as worn by the vehicle operator in normal operating position.

These and other objects of the present invention will be fully apparent from the following description when taken in conjunction with the annexed drawing, in which.

Figure 1:
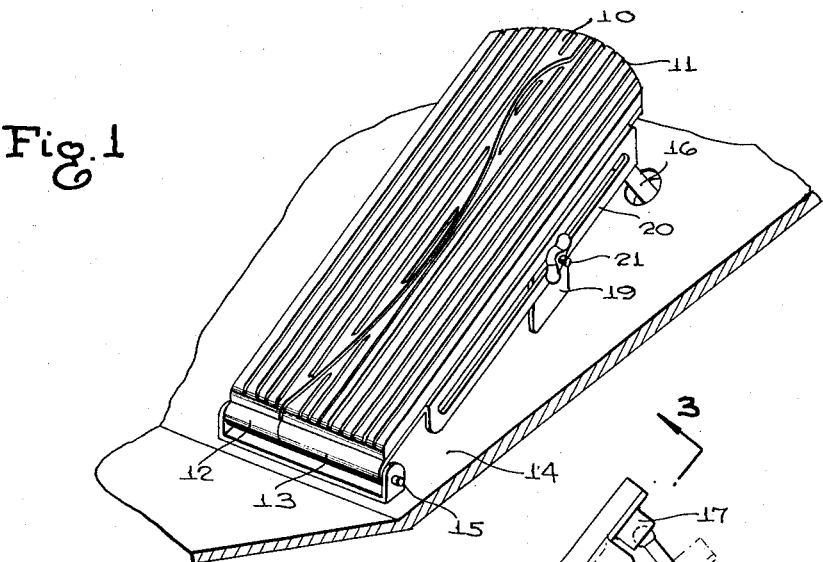
Figure 1 is a view in perspective of the present invention in place and connected to the floor of an automotive vehicle.

Referring in greater detail to the drawing in which like numerals indicate like parts throughout the several views, the invention is seen to consist of a pair of pedals 10 and 11, having their complemental ends 12 and 13, respectively, pivotally secured to the floor of an automotive vehicle, indicated by the reference numeral 14, for rotation about a horizontal axis, on the pivot pin 15, as seen most clearly in Figure 1.

Figure 2:
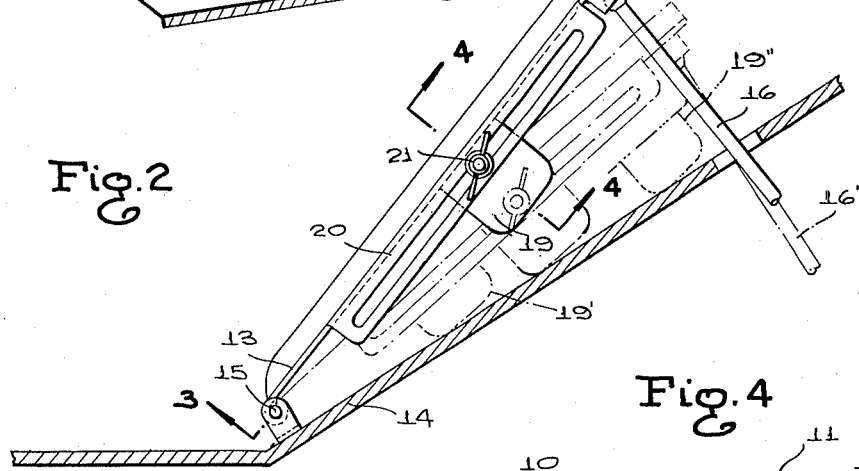
Figure 2 is a side view in elevation of the present invention.

An accelerator push rod 16 is indicated in Figure 2 and is movable downwardly to the position indicated in dotted lines at 16' at which position it is operatively connected to the engine of the vehicle (not shown) to increase the speed of the vehicle. Obviously, upon its return to the full line position indicated by the reference numeral 16 in Figure 2, the engine speed decreases to that of idling. A conventional ball joint indicated by reference numeral 17 in Figures 2 and 4 secures the one pedal 10 to the accelerator push rod 16.

The one pedal 10 is movable independently of the pedal 11 to operate the accelerator push rod 16 to increase the speed of the engine of the vehicle. A bracket 18 projects from the confronting side edge of the one pedal 10 and is engageable by the other pedal 11 upon a downward movement of the pedal 11 to operate both the pedals 10 and 11 in unison.

Figure 4:
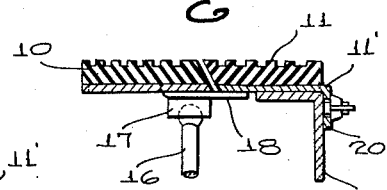
Figure 4 is an end view in cross section on line 4—4 of Figure 2.

Along the non-confronting edge of the pedal 11 is an L-shaped bracket 19 carried by the base of the pedal 11 where it is bent over to form a right angle leg 20, as shown most clearly in Figure 4. The base 20 is formed with a slot in which is slidable the bolt 21 projecting from the bracket 19, the lower end of which is engageable with the floor 14 of the vehicle to limit the downward movement of the pedal 11 whenever the foot of the operator of the vehicle extends over the two pedals evenly and is applied with pressure to the pedals 10 and 11 in unison.

The bracket 19 is adjustable along the slot in the leg 20, and as shown in Figure 2, is movable from the position indicated in dotted lines at 19' to a position indicated in dotted lines at 19". This permits the adjustment of the top limit of speed at which the vehicle may be driven, the position indicated at dotted lines at 19" obviously being the higher speed.

Figure 3:
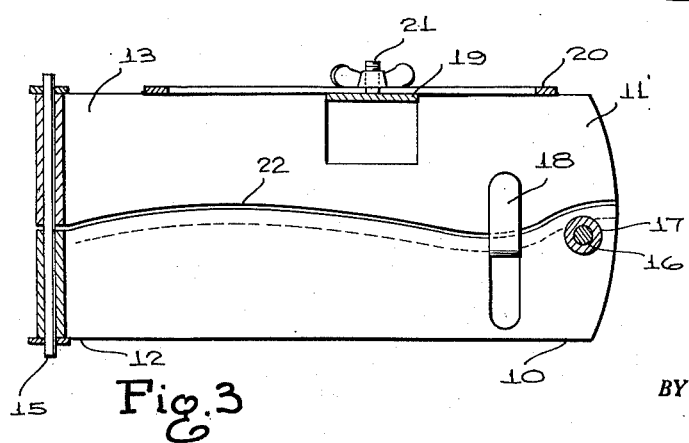
Figure 3 is a bottom view on line 3—3 of Figure 2.

The confronting side edges of the pedals 10 and 11 form an undulating line which has a curve, indicated in Figure 3 by the reference numeral 22, conformably shaped to the side edge of the sole of a shoe as worn by the vehicle operator in normal operating position.

The confronting side edges of the pedal 10 and the pedal 11 are cut so that the pedal 10 does not interfere nor engage the side edge of the pedal 11, as seen most clearly in Figure 4.

Another curve at the upper end of the pedal 10 permits the connection of the accelerator push rod 16 to be as close to the longitudinal median line of the two pedals. In operation, the bracket 19 is adjusted along the slot in the leg 20 to limit the downward movement of the accelerator push rod 16 to that required by a certain speed of the vehicle. The vehicle will then maintain this speed, with the driver's foot comfortably pressing the pedal all the way to the limit of its movement without further adjustment or further movement of the pedal 11 upwardly or downwardly to maintain the speed. Hills, of course, will slow the vehicle and added speed may be obtained by the driver shifting his foot to the pedal 10 and depressing the pedal 10 beyond the limit of movement to effect the further movement of the accelerator push rod 16 through the opening in the floor 14 to speed up the engine of the vehicle.

While only a single embodiment of the present invention has been here illustrated and described, it is believed that other embodiments may be made and practiced within the scope of the appended claims without departing from the spirit of the invention.

What is claimed is:

1. For use with an automotive vehicle having a floor and an accelerator push rod projecting through an opening in the floor and operatively connected to the engine of the vehicle for increasing the speed of the vehicle upon downward movement of the rod through said opening, a speed control device comprising a pair of pedals, means connecting one of the complemental ends of said pedals to said vehicle floor for movement about a horizontal axis, said pedals being arranged in side to side relation and having a side edge of one of said pedals adjacent to but not in contact with the confronting side edge of the other of said pedals, means connecting one of said pedals to said push rod for reciprocating movement of the latter through said opening, means carried by said one of said pedals operatively engageable by said other pedal upon downward movement of the latter to depress said one pedal, and stop means carried by said other pedal engageable with said floor to limit the downward movement of said other pedal, said one pedal being moveable downwardly independently of said other pedal to increase the vehicle speed over that limited by said stop means.

2. For use with an automotive vehicle having a floor and an accelerator push rod projecting through an opening in the floor and operatively connected to the engine of the vehicle for increasing the speed of the vehicle upon downward movement of the rod through said opening, a speed control device comprising a pair of pedals, means connecting one of the complemental ends of said pedals to said vehicle floor for movement about a horizontal axis, said pedals being arranged in side to side relation and having a side edge of one of said pedals adjacent to but not in contact with the confronting side edge of the other of said pedals, means connecting one of said pedals to said push rod for reciprocating movement of the latter through said opening, means carried by said one of said pedals operatively engageable by said other pedal upon downward movement of the latter to depress said one pedal, and adjustable stop means carried by said other pedal engageable with said floor to limit the downward movement of said other pedal, said one pedal being movable downwardly independently of said other pedal to increase the vehicle speed over that limited by said stop means.

3. For use with an automotive vehicle having a floor and an accelerator push rod projecting through an opening in the floor and operatively connected to the engine of the vehicle for increasing the speed of the vehicle upon downward movement of the rod through said opening, a speed control device comprising a pair of pedals, means connecting one of the complemental ends of said pedals to said vehicle floor for movement about a horizontal axis, said pedals being arranged in side to side relation and having a side edge of one of said pedals adjacent to but not in contact with the confronting side edge of the other of said pedals, means connecting one of said pedals to said push rod for reciprocating movement of the latter through said opening, means carried by said one of said pedals operatively engageable by said other pedal upon downward movement of the latter to depress said one pedal, and adjustable stop means carried by said other pedal engageable with said floor to limit the downward movement of said other pedal, said one pedal being moveable downwardly independently of said other pedal to increase the vehicle speed over that limited by said stop means, said confronting side edges being conformably shaped to form an undulating line having a curve shaped to substantially fit the outside edge of a shoe sole when the vehicle operator's foot is in position to depress said one pedal independently of said other pedal.

4. For use with an automotive vehicle having an accelerator control means operable to control the engine speed, a speed control device comprising a pair of pedals, means connecting one of the complemental ends of said pedals to said vehicle for movement about a horizontal axis, said pedals being arranged in side to side relation and having a side edge of one of said pedals adjacent to but not in contact with the confronting side edge of the other of said pedals, means connecting one of said pedals to said control means for operatively controlling the engine speed, means carried by said one pedal operatively engageable by said other pedal upon downward movement of the latter to depress said one pedal, and adjustable stop means carried by said other pedal engageable with an adjacent portion of said vehicle to limit the downward movement of said other pedal, said one pedal being movable downwardly independently of said other pedal to increase the vehicle speed over that limited by said stop means.

References Cited in the file of this patent

UNITED STATES PATENTS

| | | |
|---|---|---|
| 1,226,118 | Salt | May 15, 1917 |
| 2,003,751 | Kramer | June 4, 1935 |
| 2,199,963 | Romberger | May 7, 1940 |
| 2,600,267 | Ruscito et al. | June 10, 1952 |
| 2,679,767 | Wasserkrug | June 1, 1954 |

FOREIGN PATENTS

| | | |
|---|---|---|
| 485,901 | Great Britain | May 26, 1938 |